(No Model.) 2 Sheets—Sheet 1.

J. C. STEPHENS.
BICYCLE.

No. 575,529. Patented Jan. 19, 1897.

Witnesses:
D. W. Gardner
Louis A. Rowley

Inventor:
John C. Stephens
By his Attorney
George William Miatt (No Model.) 2 Sheets—Sheet 2.
J. C. STEPHENS.
BICYCLE.
No. 575,529. Patented Jan. 19, 1897.
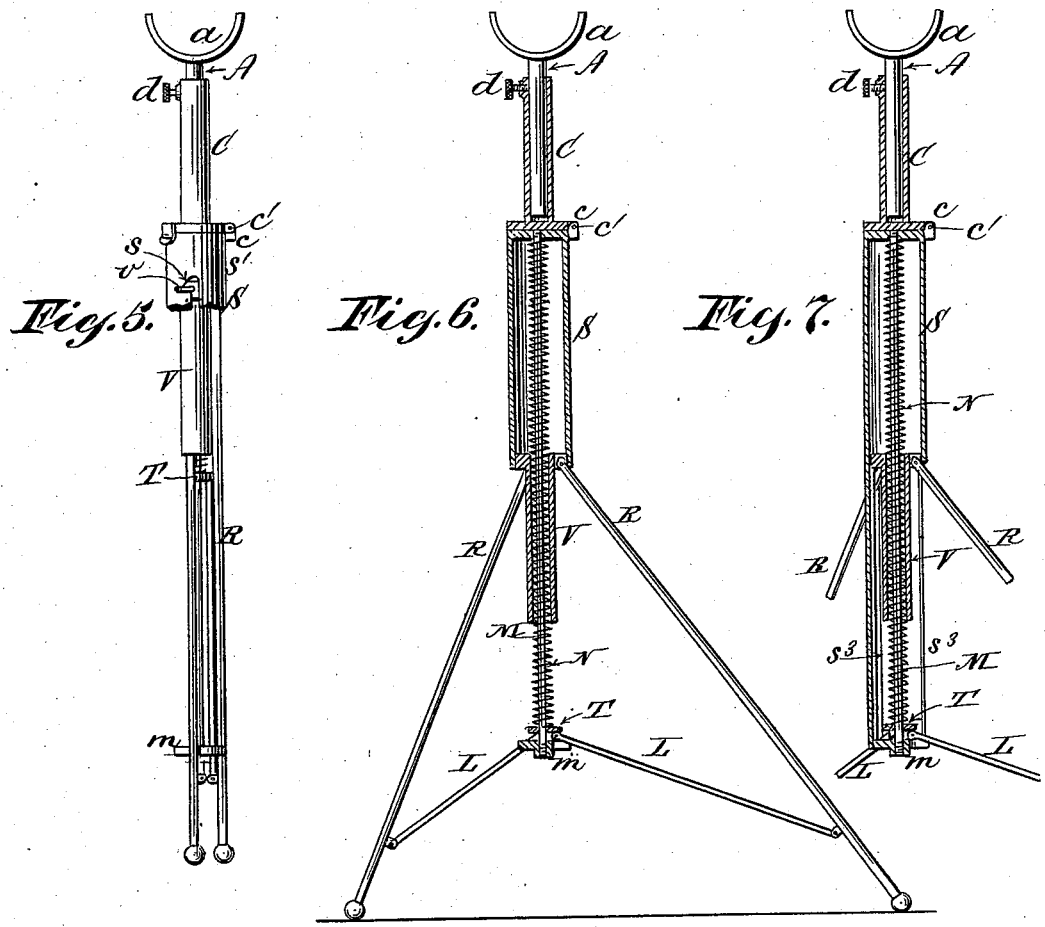
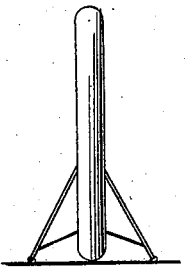
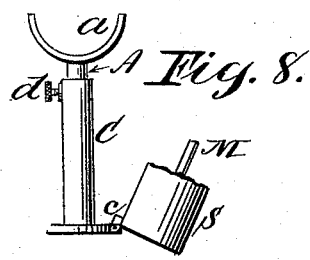

UNITED STATES PATENT OFFICE.

JOHN C. STEPHENS, OF NEW YORK, N. Y.

BICYCLE.

SPECIFICATION forming part of Letters Patent No. 575,529, dated January 19, 1897.

Application filed June 16, 1896. Serial No. 595,730. (No model.)

*To all whom it may concern:*

Be it known that I, JOHN C. STEPHENS, a citizen of the United States, residing in the city, county, and State of New York, have invented certain new and useful Improvements in Bicycles, of which the following is a specification sufficient to enable others skilled in the art to which the invention appertains to make and use the same.

The invention is designed to afford a simple light attachment for bicycles adapted to be held up out of the way when not in use and to be quickly and conveniently adjusted to support the bicycle laterally when at rest.

The invention consists in the special construction and arrangement of parts hereinafter described and claimed.

In the accompanying drawings I show a structure embodying all the essential features of my invention, although I do not wish to confine myself to the identical form and structure of parts shown, since modifications may be made therein without departing from the spirit and intent of my invention.

Figure 1:
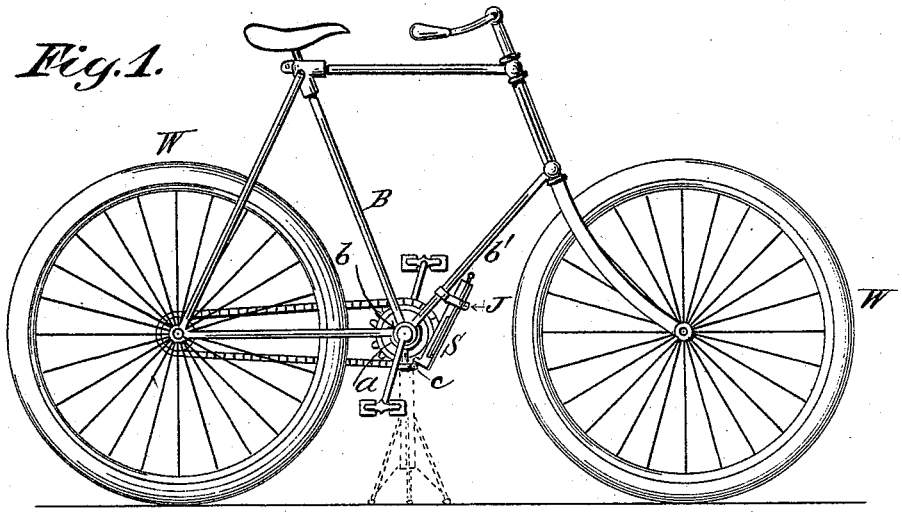
Figure 2:
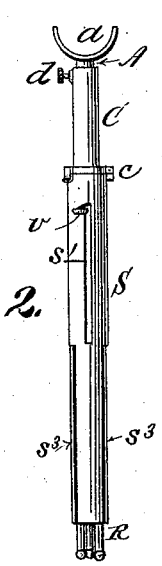
Figure 3:
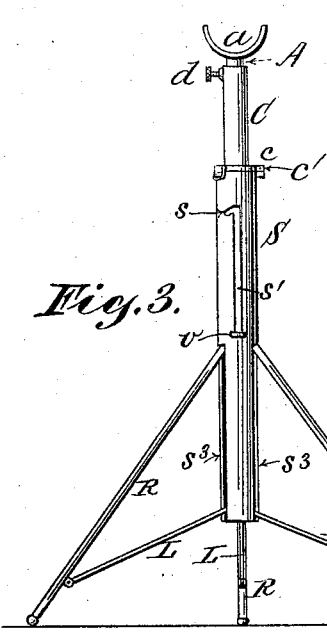
Figure 4:
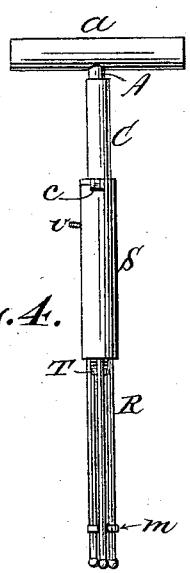

Figure 1 is a side elevation of a bicycle provided with my improvement, the use of the rest being indicated by dotted lines. Fig. 2 is an elevation of the rest closed; Fig. 3, a similar view of the rest with the brace-bars extended; Fig. 4, a view of a modified form of the rest closed, the encircling tube in this case being shortened; Fig. 5, a view of the same structure upon a larger scale and from a plane at right angles to that of Fig. 4. Fig. 6 is a vertical section of the rest extended; Fig. 7, a vertical section of the structure shown in the first three figures, having the extended tube. Fig. 8 is a detail in elevation of the extension-piece and hinged brace-support; Fig. 9, a diagram illustrating the use of two opposed braces.

My bicycle-rest may be attached to the frame of the machine at any point between the wheels, although I prefer to attach it to the tubular bearing in which the treadle-shaft rests. To this end I form the stem A with a semicylindrical socket or head $a$, which fits the under side of the ordinary tubular treadle-shaft bearing $b$, extending transversely across the lower part of the bicycle-frame B, the socket $a$ being secured in position on the bearing $b$ by clamps or other well-known mechanical expedients. It is obvious that the place and means of attachment of the rest to the frame B are of secondary importance, provided the rest can freely be used between the wheels W W of the machine. Fitting over the stem A is an extension-tube C, having the hinge-plate $c$ formed integral therewith and being secured to the stem A by a thumb-screw $d$.

The brace-tube S is pivotally secured to the hinge-plate $c$, as at $c'$, or in lieu thereof a ball-and-socket joint may be substituted as a means of connecting the extension-tube C and brace-support S, or any other form of connection used that will admit of the required movement of the brace-support S and the parts carried by it.

Projecting from the tube S is the main rod M, the outer end of which is provided with the collar $m$, which limits the outward movement of the traveler T, to which the inner ends of the stay-links L are secured.

The outer ends of the stay-links L are secured each to one of the brace-rods R near the outer ends of the latter, they being in turn pivotally attached at their inner ends to the inner end of the sleeve V.

I have illustrated the employment of three brace-rods R, although two may be used, if preferred, arranged to extend on opposite sides of the frame, as in Fig. 9, and affording, with the wheels, four points of contact with the ground, although the use of three or more brace-rods R is preferable, especially if it is designed to support the bicycle independent of the wheels.

A spiral spring N preferably extends around the main rod M, resting at one end against the traveler T, although this spring may be dispensed with, since the device is operative without it, being readily opened and adjusted by hand. When used, however, the spring N tends constantly to throw the braces R out and apart and is valuable in rendering the device automatic in action to that extent.

In order to hold the parts folded and closed, whether the spring be used or not, a catch or fastening is desirable, the form of which may be varied to suit the fancy or the requirements of special use. As shown in the drawings, a pin or stud $v$ on the sleeve V is made to engage with a notch $s$ at the inner end of the longitudinal slot $s'$ on the tube S.

The tube S necessarily extends outward a sufficient distance to bear against the inner ends of the brace-rods R when the latter are extended, as in Fig. 6, or if the tube S extends out farther, as in Figs. 1, 2, 3, and 7, it is formed with the longitudinal slots $s^3$, through which the brace-rods R and links L protrude, the tube S in any case resting upon the brace-rods R, when open and in use.

The tube S guides and centralizes the sleeve V, thereby also protecting the spring N when the latter is used.

The use and operation of my bicycle-rest will be readily understood. The device having been secured to the frame of the bicycle, the extension-tube is adjusted on the stem A to suit the height of the machine, although it may be stated in this connection that where the device is made for use upon a machine of a prescribed size the adjustable extension-sleeve C may obviously be dispensed with, since no adjustment will then be necessary, and I do not therefore limit myself to its use. The rest having been secured to the frame and not being desired for immediate use, the brace-support S and the parts carried therein are turned up against the front member $b'$ of the frame B, in which position they are held by spring-jaws J or equivalent means.

When desired for use, the brace-support S and connections are lowered and the stud $v$ released from the notch $s$, when the spring N, if used, will throw the braces R open, or they may be opened by hand in the absence of the spring, the weight of the bicycle holding them apart.

What I claim as my invention, and desire to secure by Letters Patent, is—

1. In an attachment for bicycles the combination of the tube S, pivotally connected with the frame of the machine, the sleeve V, two or more lateral brace-rods R, pivotally connected to said sleeve, the rod M, provided with the collar $m$, at its outer end, the traveler T, and the links L, connecting said traveler with the brace-rods R, substantially in the manner and for the purpose described.

2. In an attachment for bicycles the combination of the tube S, pivotally connected with the frame of the machine, the sleeve V, two or more lateral brace-rods R, pivotally connected to said sleeve, the rod M, provided with the collar $m$, at its outer end, the traveler T, the links L, connecting said traveler with the brace-rods R, and the spring N, the whole arranged and operating substantially in the manner and for the purpose described.

3. In an attachment for bicycles the combination of the stem A, having the socket $a$, the extension-tube C, and binding-screw $d$, the tube S, pivotally connected to the extension C, the sleeve V, and the stay-rods R, pivotally connected thereto, for the purpose and substantially in the manner described.

JOHN C. STEPHENS.

Witnesses:
O. W. GARDNER,
LOUIS N. ROWLEY.